Feb. 27, 1968  J. H. MOSTERD  3,370,691
DEVICE FOR TRANSFERRING EGGS
Filed Sept. 14, 1966  4 Sheets-Sheet 1
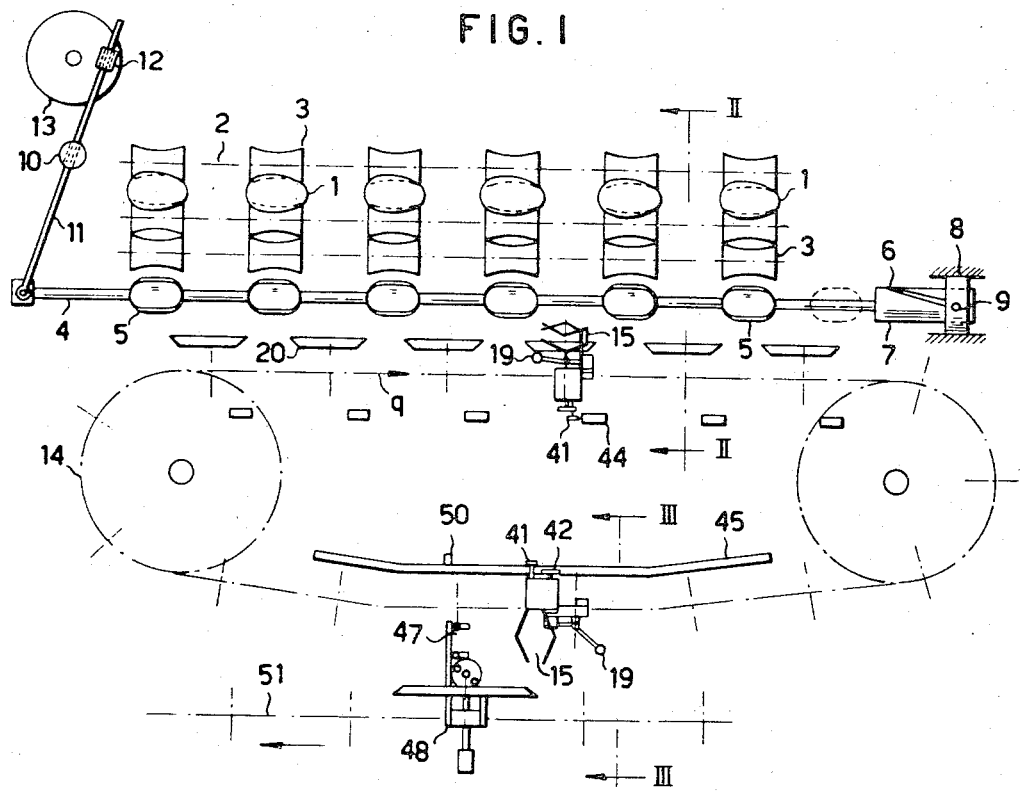
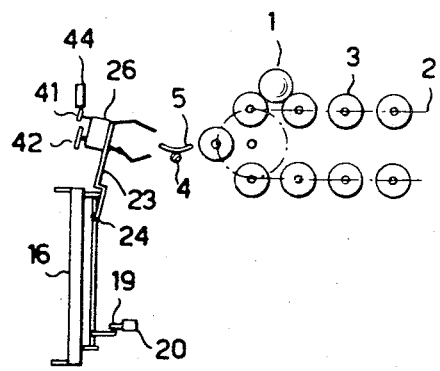
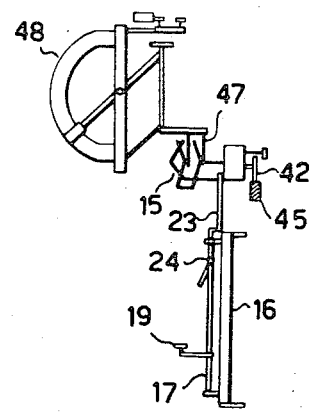
INVENTOR
JACOB HENDRIKUS MOSTERD
BY *Gordon W. Hueschen*
ATTORNEY Feb. 27, 1968   J. H. MOSTERD   3,370,691
DEVICE FOR TRANSFERRING EGGS
Filed Sept. 14, 1966   4 Sheets-Sheet 2
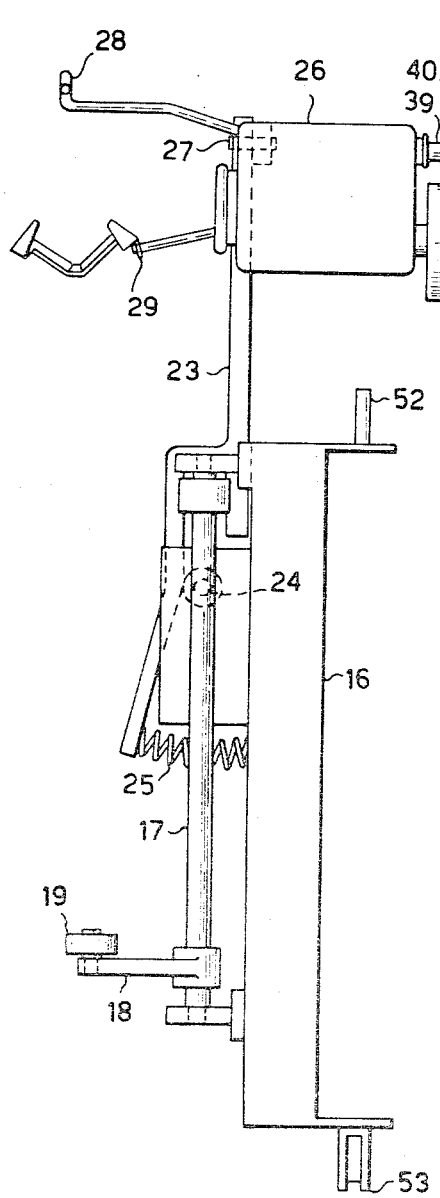
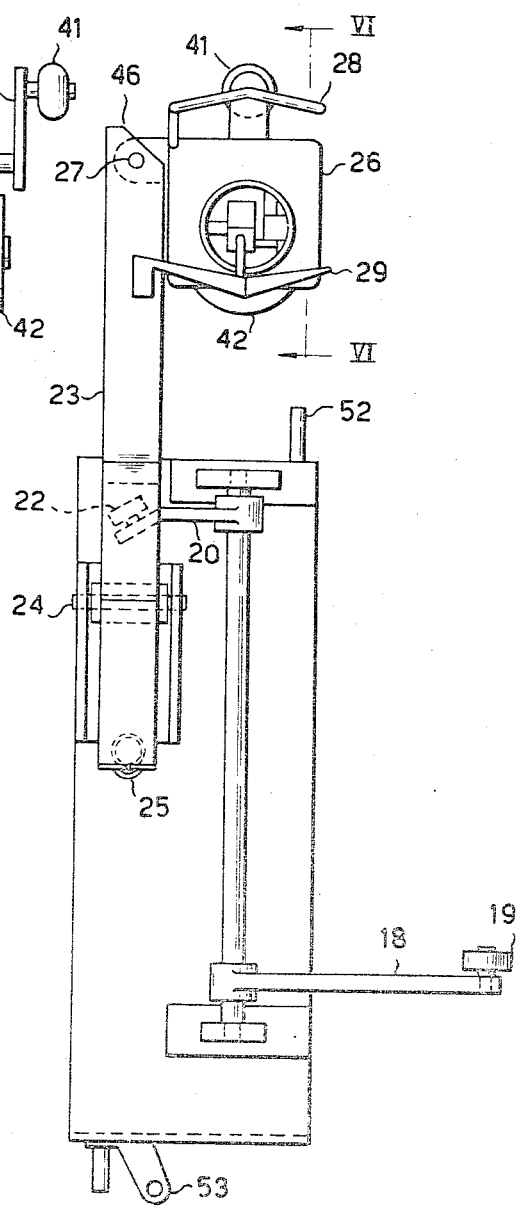
INVENTOR
JACOB HENDRIKUS MOSTERD Feb. 27, 1968  J. H. MOSTERD  3,370,691
DEVICE FOR TRANSFERRING EGGS Filed Sept. 14, 1966  4 Sheets-Sheet 4

INVENTOR
JACOB HENDRIKUS MOSTERD

BY *Gordon A. Huesiken*

ATTORNEY

United States Patent Office 3,370,691
Patented Feb. 27, 1968

3,370,691
DEVICE FOR TRANSFERRING EGGS
Jacob H. Mosterd, Barneveld, Netherlands, assignor to Moba A.G., Basel, Switzerland
Filed Sept. 14, 1966, Ser. No. 579,289
Claims priority, application Netherlands, Sept. 16, 1965, 65—12,102
7 Claims. (Cl. 198—32)

The invention relates to a device for simultaneously transferring eggs the axial orientation of which is horizontal from a number of juxtapositioned feed-in locations horizontally spaced from each other into receiving members moving the one behind the other which receiving members each can contain one egg with the axial orientation of the eggs in the receiving members vertical. Such devices are of great importance in many automatic egg handling machines, e.g. sorting machines in which it is a difficulty that ever higher handling speeds of such devices are required and that nevertheless a great security must be obtained that no eggs will break.

With relatively high handling speeds it is of great importance that the eggs are positively held. The invention provides in a device, in which this is possible and in which further the above mentioned requirements are met. Accordingly the invention provides a device having a chain, that is provided with egg retaining members is movably mounted past the feed-in locations, which chain moves also along a track of receiving members moving the one behind the other, in which each egg retaining member is provided with a tiltable mounted gripper and along the chain stationary control members are mounted, which can cooperate with parts of the egg retaining members for opening, closing respectively tilting the gripper.

It will be clear, that with the invention the chain of the egg retaining members has to move with a relatively high speed, if the number of juxtapositioned feed-in locations is considerable e.g. six.

In order to secure in said instance the transfer of the eggs to the egg retaining members in a reliable way there is provided according to a further elaboration of the invention in that between the belt of the egg retaining members and the feed-in locations a shiftable and tiltable transfer member is mounted, which is deviced for moving at the moment of tilting with the same speed and in the same direction as moves the belt for the egg retaining members.

It has been shown to be of great value, if the egg retaining members are provided with a further tilting axis and as many guides as there are feed-in locations which guides are mounted at different heights an equal number of egg retaining members each being provided with a follow member, which are mounted also at different heights, which correspond to the heights of the guides, which guides have such a form, that the grippers at the moment of receiving an egg are tilted somewhat towards the feed-in locations and move back again afterwards.

By reason of this small tilting movement of the egg retaining members, which immediately after receipt of the eggs are tilted back, the eggs are very well received in the grippers. In this instance it is preferred, that the grippers have a first arm bearing at least two bent pins and a further arm bearing at least one bent pin, which are movable towards each other and away from each other the pins of the said first arm being positioned horizontally or almost horizontally at the moment of receiving an egg. Though in principle it is possible to have each of said arms movable it has been shown that a favourable receipt movement of the eggs is obtained, if the lower arm that bears two bent pins after receipt of an egg carries out a closing movement towards the other fixed pin.

When the receiving devices also are provided with grippers which of course is very senseful, if one wants to maintain the advantage that the eggs are positively held, it is preferred according to a further elaboration of the invention, that every receiving device is provided with a further gripper, of which the pins are staggeredly mounted with respect to the grippers of the egg retaining members and in that the track of the belt of the egg retaining members beyond the location of cooperation between the egg retaining members and the receiving devices departs from the track of the receiving device under a slight angle. It has proved that in this way the eggs are very reliably transferred and that no interference occurs when the grippers again move away from each other.

The invention in the following is elucidated by means of the accompanying drawing.

FIGURE 1 shows a schematical plan view of an embodiment of the invention;

FIGURE 2 shows a section of a detail of the device of FIGURE 1 taken over the line II—II;

FIGURE 3 shows a section of a further detail taken over the line III—III;

FIGURES 4 and 5 show a side respectively front elevation of a tilting gripper used with the invention;

Figure 6:
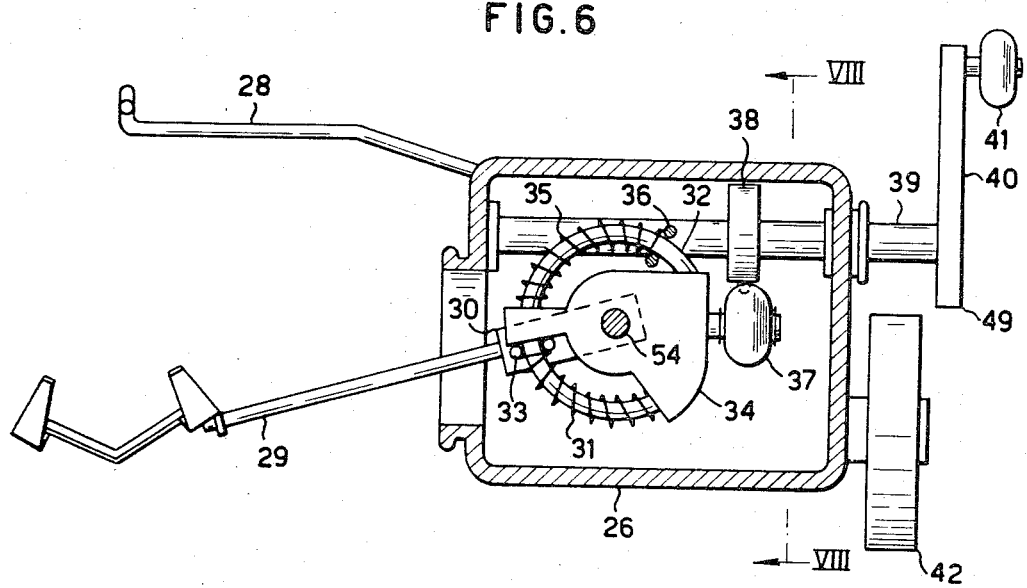
FIGURE 6 shows a plan view of the gripper of FIGURES 4 and 5, partly in cross-section, in a first working position.

In FIGURE 1 the reference 2 shows a roller chain having six roller tracks 3 along which eggs 1 can be fed in. The roller tracks are bent downwardly at their ends and the locations of these track curves are the feed-in locations from which the eggs have to be removed.

At these ends of the roller tracks there is provided a rod 4 with a number of cups 5 attached to it. The rod 4 can shift in axial direction and rotates about its axis, for which purpose at its right hand side a sleeve 7 provided with a guide slit 6 has been fixedly mounted to the rod 4, which sleeve slides in a ring 8 provided with a slide-key 9.

The rod 2 is driven by means of a pivot arm 11 pivotally and shiftably supported at 10 and guided in a sleeve 12, which pivotally has been mounted to an intermittently driven disc 13.

If the movement of the rod 2 has to be controlled very accurately it is also possible to use a cam-mechanism for moving to and fro the rod 4.

Figure 7:
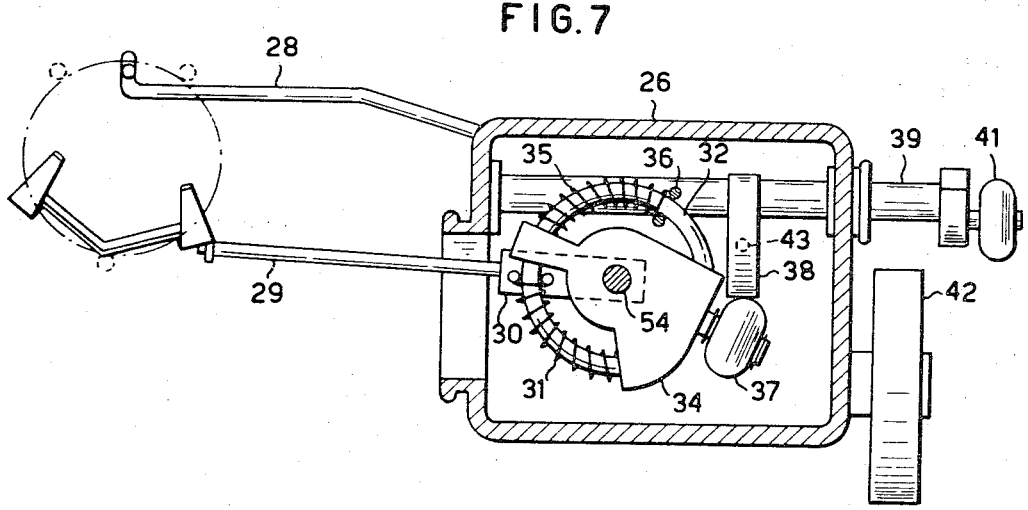
FIGURE 7 shows the same as FIGURE 6 in a second working position.
Figure 8:
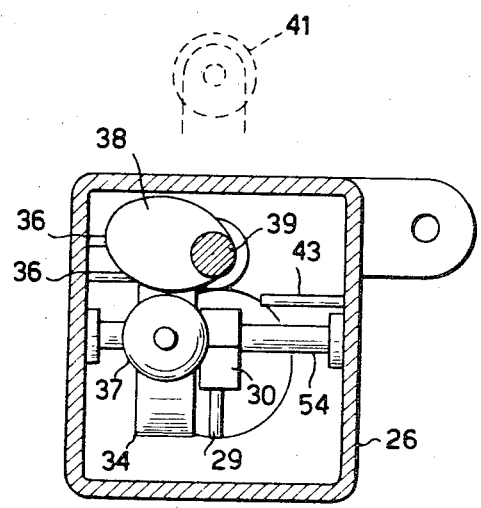
FIGURE 8 shows a cross-section over the line VIII—VIII of FIGURE 6.

When moving towards the right the rod 4 rotates such that eggs present in the cups 5 can roll out of them. When doing so they are taken over by a number of tiltable grippers 15 moving along a track 14. These grippers of which details have been shown in FIGURES 4-8 inclusive, are each mounted to a support 16, the supports 16 being attached to each other to form an endless chain 14. At the frontside of each support 16 a vertical shaft 17 has been mounted which supports a crank lever 18 provided with a follow roller 19. Of six succeeding grippers the crank levers 18 are placed at different heights which heights correspond to the heights of the guides 20 (FIGURE 1). The one and the other is such, that when moving the chain 14 in the direction of the arrow P six tilting grippers cooperate simultaneously each by means of their follow roller 19 with a guide 20. At the upper side of the shaft 17 a further crank lever 21 has been mounted, which by means of a roller 22 or suchlike engages a tiltable arm 23, which can pivot about an axis 24 and is held by means of a pressure spring 25 in the position shown in FIGURE 4. At the upper side of the arm 23 there is provided a gripper 26, which can rotate over an angle of 90° about an axis 27. The gripper 26 has a fixed arm 28 with a single bent pin and an arm 29 with two bent pins for gripping an egg 1. As more particular has been shown in FIGURES 6 and 7, the arm 29 is mounted in a block 30, that can pivot about a pivot shaft 54. In its closing direction the arm 29 is spring biased by means of a spring 31, which has been mounted on a ring 32 and which engages at its one end the pins 33 mounted to the block 30 and at its other side a control member 34, which has been fixedly mounted to the ring 32. A further pressure spring 35 abuts at one side against fixed pins 36 and at its other side against the control member 34. This control member has been provided with a cam follow roller 37, which cooperates with a cam 38, which is attached to a shaft 39, with which the lever 40 has been connected, which lever at one side is provided with a follow roller 41. Further the gripper 26 is provided with a guide-roller 42 for controlling the pivoting movement about the axis 27. The cam 38 engages after rotation clockwise in FIGURE 8 over somewhat more than 90° against the pin 43 and is then retained, because it passed with its greatest radius the follow roller 37.

The receiving members, that continuously are moved along a track 51 in the direction from left to right in FIGURE 1 are schematically elucidated in FIGURE 3. In the embodiment shown they each consist of a weighing device 48 having a gripper 47 for receiving an egg.

The track or chain 51 of the receiving members is driven continuously with the same speed as the chain 14, such that always a gripper 47 can cooperate with a gripper 15.

The actual construction of grippers 47 and the means for controlling them are not material for this invention. For clarity's sake it is indicated, that preferably the grippers 47 also have an arm bearing two bent pins and a further pivotable arm bearing a single bent pin (not shown).

At the moment of transfer the single bent pin of a gripper 47 is located between the two bent pins of gripper 15 and the single pin of gripper is situated between the two bent pins of gripper 47.

The pins of gripper 47 are downwardly directed and the pins of gripper 15 upwardly.

Track 14 converges under a small angle towards track 51 before the region in which eggs are transferred from grippers 15 into grippers 47 and diverge from said track beyond said transfer region.

The working of the device described is the following: after that eggs 1 by means of the roller tracks 3 have been transferred to the cups 5, rod 4 moves towards the right and tilts when moving so. At that moment a number of six grippers 15, which each cooperate via their own follow rollers 19 with a guide 20, are positioned in front of the cups 5. The driving members are dimensioned such, that at that moment the horizontal speed of the cups 5 equals the horizontal speed of the grippers 15. Because the follow rollers 19 engage the guides 20 the tiltable arms 23 are tilted counterclockwise by arm 21 and roller 22, so that the double pins of arm 29 can easily receive an egg 1. After this the follow roller 41 engages a guide 44 fixedly mounted along the track of chain 14, so that cam 38 is rotated and arm 29 resiliently is moved upwardly until the received egg 1 engages the pin of the arm 28. Excessive clamping forces exerted on egg 1 are prevented by spring 31. After this the roller 41 engages the fixed guide 45, by reason of which the gripper 26 is pivoted around axis 27 about 90° and engages the upper surface 46 of the tilting arm 23. In this position the gripper 15 is positioned oppositely to a receiving device, e.g. a weighing device 48 provided with a gripper 47, which at one side has a gripper arm with two pins and at its other side a gripper arm with one pin. The pins are mainly vertically oriented and somewhat bent, corresponding to the pins of the gripper arms 28 and 29, but staggered with respect to these pins. After the pins having gripped an egg from both sides to at first two pins at the foreside and then one pin at the backside the lower end 49 of the arm 40 engages an abutment 50 so that the cam 38 is moved through its dead point, after which the gripper arm 29 opens by reason of spring 35. Because the track 14 of the grippers 15 after this diverges under a small angle with respect to the track 51 of the weighing devices 48, the gripper arms 28 and 29 gradually move away from the egg 1 without interfering with the gripper members 47 of the weighing device 48.

The gripper members according to the invention carry out a number of useful jobs: first they open (spreading between the arms 28 and 29) after this they tilt somewhat in forward direction for receiving an egg from a cup 5, after this they tilt back and close, after which they rotate about 90° and position the eggs vertically. After this the gripper opens again and is restored into its original position by means of further guide means (not shown), which cooperate with roller 43.

An important advantage of the invention is, that it is possible to supply eggs that have been fed in with their axes horizontally by means of roller tracks, orient the axes of the eggs vertical and transferring them onto a receiving device, when continuously positively retaining the eggs. This latter feature is of great importance, because chain 14 has to move with a relatively high speed for the simple reason that it has to move along the width of six grippers 15 in the period in which the roller chain 2 only moves over the distance between two adjacent rolls. It has proved that the invention in this respect is very favourable and that with the invention it is possible to attain higher handling speeds than up till now were possible, as far as the inventor knowns, with such like devices. Another important advantage of the invention is that it is practically impossible for an egg to fall and break. It may be useful to point out that a single broken egg could induce a standby time of the machine of about half an hour, if the machine has to be stopped and the mechanism completely has to be cleaned.

What I claim is:

1. Device for transferring eggs, provided with a number of feed-in stations, juxtapositioned in a row, means for synchronously driving the feed-in stations, a movably mounted chain, part of which is parallel and near to the row of feed-in stations, which chain is provided with egg retaining members that are mutually spaced over the same distance as are the feed-in stations, each egg retaining member being provided with a tilting mechanism and a gripper supported by the related tilting mechanism, a gripper control means supported by each retaining member, a tilt control means stationary mounted near said chain, a gripper control means in each retaining member and a stationary gripper control means near said chain, the stationary tilt control means being adapted to cooperate with the tilt control means supported by the retaining members and the stationary gripping control means being adapted to cooperate with the gripper control means supported by the egg retaining members.

2. Device according to claim 1 in which between the rows of feed-in stations and the part of the chain parallel to the feed-in stations a shiftable and tiltable transfer member is mounted, means being provided for shifting the transfer member and simultaneously tilting it, which means are such devised that the control member at the moment of tilt of it moves parallel to said part of the chain, driving means for the chain and the transfer member, which driving means are coupled to each other such that the transfer member at the moment of tilt moves at the same velocity and in the same direction as the chain.

3. Device according to claim 1 in which the egg retaining members are provided with a further pivot shaft and in which as many cam guides are present as there are feed-in stations, which cam guides are mounted at mutually different heights, a number of egg retaining members, which equals the number of feed-in stations being provided with a follow member that has been mounted on different heights for different egg retaining members, which heights correspond to the heights of the cam guides, the cam guides being formed such, that the grippers of the said number of egg retaining members are pivoted simultaneously towards the feed-in stations and after this away from them at the moment the transfer member tilts for transferring an egg to each of the said retaining members.

4. Device according to claim 1, in which the grippers each are provided with a first lever bearing at least two bent pins and a further lever, bearing at least one bent pin, which levers are pivotably towards each other and away from each other, the first lever being positioned such that its pins are substantially horizontally oriented at the moment of receiving an egg.

5. Device according to claim 4, provided with a receiving device having a number of receiving grippers, the pins of which are staggered with respect to the pins of the grippers of the egg retaining members, which receiving device is movably mounted along a track that partly is parallel and near to that of the said chain, the tracks of the chain and of the receiving device diverging from each other under a slight angle beyond the part of the track of the receiving device where it is parallel and near to the track of the chain.

6. Device according to claim 1 in which each gripper of the egg retaining devices is provided with a shaft bearing a cam lever that supports a control member and a cam, a pivotably mounted member supporting a follower in cooperative relation to said cam, spring means for biasing said pivotably mounted member, a pivotably mounted gripper lever, a pressure spring mounted between said pivotably mounted member and said gripper lever, said pivotably mounted member being further provided with a portion abutting the said gripper lever in the direction of opening the gripper.

7. Device according to claim 6, in which the cam has a form with a maximum of the radius with respect to the axis of the shaft which maximum is such oriented that it passes the point of engagement with the cam follower when the said lever is moved from the opened in the closed position.

References Cited

UNITED STATES PATENTS

| | | | |
|---|---|---|---|
| 2,135,778 | 11/1938 | Wyland | 198—32 |
| 3,168,950 | 2/1965 | Niederer | 198—32 |

RICHARD E. AEGERTER, *Primary Examiner.*